United States Patent [19]

Sorensen

[11] Patent Number: 5,004,371
[45] Date of Patent: Apr. 2, 1991

[54] OFFICE PARTITION, PANEL-TO-PANEL QUICK-LOCKING MECHANISM

[75] Inventor: Thomas V. Sorensen, Sparks, Nev.
[73] Assignee: The Gunlocke Co., Avon, N.Y.
[21] Appl. No.: 164,187
[22] Filed: Mar. 4, 1988
[51] Int. Cl.⁵ .......................... F16B 9/00; H47G 5/00
[52] U.S. Cl. .................... 403/327; 403/254; 403/264; 160/135; 52/239
[58] Field of Search ............ 403/264, 254, 245, 327, 403/319, 231; 160/135; 52/239, 241

[56] References Cited

U.S. PATENT DOCUMENTS

| | | | |
|---|---|---|---|
| 3,180,459 | 4/1965 | Liskey, Jr. .................... | 403/327 X |
| 3,900,111 | 8/1975 | Hiler et al. .................... | 403/319 X |
| 4,618,064 | 10/1986 | Viklund .......................... | 403/254 X |
| 4,679,368 | 7/1987 | Pettinga et al. ................. | 403/327 X |
| 4,778,487 | 10/1988 | Chenel ........................... | 52/239 |
| 4,821,788 | 4/1989 | Nelson ........................... | 403/264 X |

Primary Examiner—Peter M. Cuomo
Attorney, Agent, or Firm—Renner, Kenner, Grieve, Bobak, Taylor & Weber

[57] ABSTRACT

The invention is a new type of locking mechanism for office panel systems which allows quick joining or separation of connecting panels without the need for tools. This is accomplished by the invention of a spring-loaded "tab and slot" locking mechanism, whereby the opposing tabs from the connecting vertical panel end, enter and lock into matching slots on the other panels by way of a spring-loaded sliding locking bar. Joining adjacent panels requires only that the panels be aligned and firmly pushed together, while separation is allowed by pulling down on the metal rings attached to the bottom of the opposing locking bars and pulling the panels apart.

5 Claims, 2 Drawing Sheets

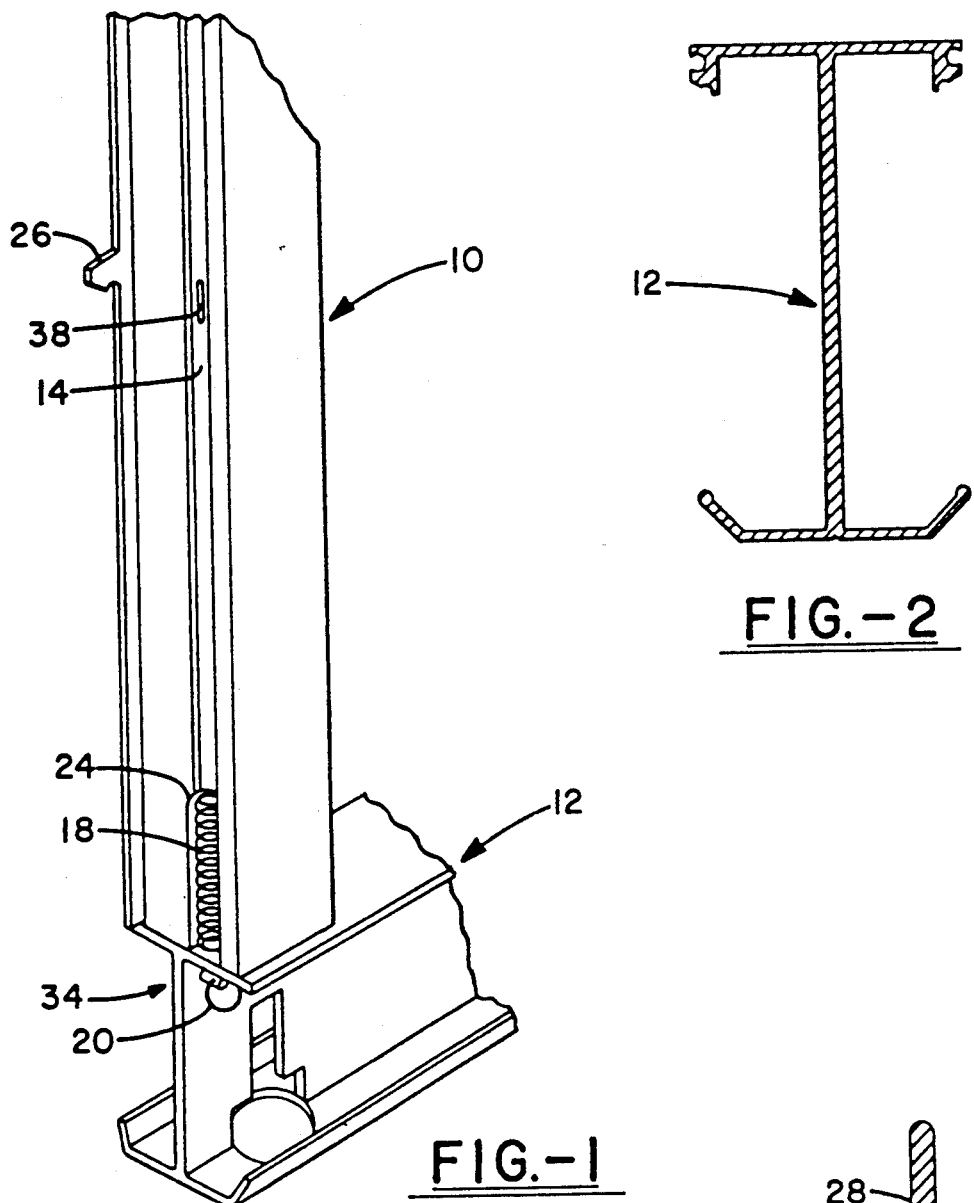
FIG.-1
FIG.-2
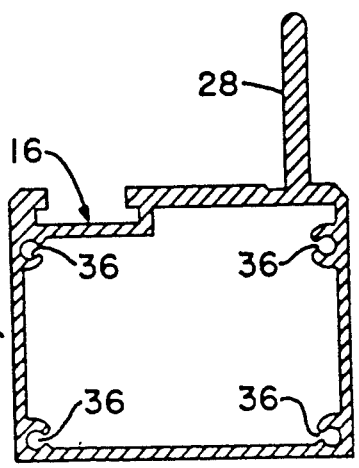
FIG.-3

OFFICE PARTITION, PANEL-TO-PANEL QUICK-LOCKING MECHANISM

TECHNICAL FIELD

The invention herein resides in the office panel systems and, more particular locking mechanism for such systems.

BACKGROUND ART

This invention presents a new type of locking mechanism for the temporary office partitions known as "office panel systems". As is known, sections of these office panels are configured in open office areas to create cubicles or private work spaces by dividing the greater work area into smaller sections. At the same time, these panels provide temporary, non-fixed walls for improved visual and acoustic privacy, as well as for the mounting of cabinets and work surfaces.

While office partition panels have been well known in the art, there has been no known office partition panel system which provides for rapid and effective engagement and disengagement of the panels without the use of tools.

DISCLOSURE OF INVENTION

In light of the foregoing, the invention itself is a spring-loaded "tab and slot" locking mechanism that allows sections of these panels to be locked securely together, merely by aligning the locking surfaces of two panels and firmly pushing the panels together. No tools are required for connection or separation of adjoining panels.

The locking mechanism is an integral part of each of the two vertical posts in the panel's rectangular framework. When two panels are pushed together, the metal tabs of either panel enter corresponding slots on the adjoining panel. The slots are cut through two metal surfaces, the first of which is a flat metal "locking" bar which is capable of sliding up and down, and is spring-loaded at one end. The second metal surface is the actual vertical post itself.

As the tabs penetrate into the slots, the angled lower edge of each tab meets the bottom edge of each slot and deflects the locking bar downward against tension supplied by the spring mounted at the bottom of the locking bar. At the furthest penetration of the tab into the slot, the locking bar encounters a notch in the bottom edge of the tab, and due to existing upward spring tension on the locking bar, the bar travels upward into the notch, thereby preventing the tab from withdrawing from the slot.

To disengage the two panels, the metal pull ring attached to the bottom of each locking bar is pulled down against spring tension, thereby freeing the bar from the notches in the opposite panel's tabs and allowing the panels to be pulled apart.

DESCRIPTION OF DRAWINGS

For a complete understanding of the objects, techniques, and structure of the invention, reference should be made to the following detailed description and accompanying drawings, wherein:

FIG. 1 is a partial perspective view of the panel locking mechanism of the invention, showing the vertical post of the panel attached to the horizontal I beam thereof;

FIG. 2 is a cross sectional view of the horizontal I beam of FIG. 1;

FIG. 3 is a cross sectional view of the vertical post of FIG. 1;

BEST MODE FOR CARRYING OUT THE INVENTION

Figure 4:
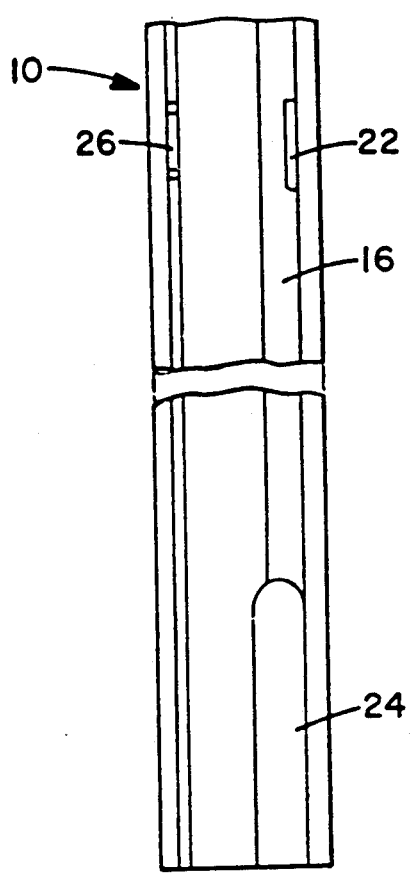
FIG. 4 is a front elevational view of the vertical post of FIG. 1.

The structural features of the locking mechanism for office panel systems according to the invention are best understood with reference to the drawings. As shown, an extruded aluminum post 10 is used for both vertical sides of the panel's rectangular framework. An extruded aluminum I beam 12 is used for the lower horizontal component of the panel's rectangular framework, interconnecting the vertical side posts 10. An aluminum locking bar 14 is slidably received within an open faced channel 16 on the outside of the panel posts 10. The locking bar 14 is of a length dependent on the height of the vertical posts 10, and is preferably of stock 1/16" thick and 3/16" wide. A 1" diameter split metal pull-ring 20 attaches to the bottom end of the locking bar 14 to allow release of the locking action as will be discussed later herein.

In manufacture, the extruded aluminum posts 10 are cut to various lengths depending on the intended height of the overall panel. After cutting, the posts 10 have slots 22, which are preferably 5/32" wide×1" high, stamped in the locking bar's channel 16 starting 17" from the bottom of the post and continuing at evenly spaced intervals toward the top.

At the bottom of the locking bar's channel 16, a cutout 24 measuring ⅜" wide and 3.5" high is milled to provide room for the spring 18.

Tabs 26 are stamped in the flange 28 that extends perpendicularly away from the outside surface of the post 10, every 18" starting at the bottom of the post and continuing toward the top. As shown in the drawings, the tabs 26 and slots 22 are preferably in horizontal alignment.

Figure 6:
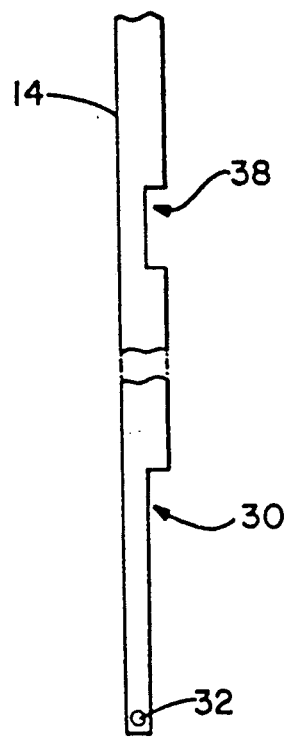
FIG. 6 is a partial front elevational view of the locking bar employed in the vertical post of FIG. 1.

As shown in FIG. 6, the bottom of the locking bar 14 is stamped to remove ¼" from one side for a length of 3¼" starting at the bottom as designated at 30. This is done to allow the spring 18 to fit over the bottom of the bar 14 and allow the bar to rest on the top of the spring. Then a ⅛" hole 32 is stamped 3/16" from the bottom and centered in the remaining portion of the locking bar, to accept installation of the metal pull-ring 20.

A slot 34, 19/32" wide×3/32" deep, is stamped into the top of the I beam 12 directly under the locking bar channel 16 in the post, to allow the passage of the locking bar 14. Four ⅛" holes are stamped into the top of the I beam 12, to allow mounting screws to pass up through the top of the I beam into threaded channels 36 in the corners at the bottom of each post.

The assembly of the structure just described should now be apparent. One simply begins by putting the post 10 on top of the end of the I beam 12 and screwing the four mounting screws up through the top of the I beam and into the threaded channels 36 in the bottom of each post.

Next, the spring 18 is placed in the cutout area 24 in the bottom of the post 10, atop the I beam.

From the top of the post 10, the locking bar 14 is then slid into the locking bar channel 16, keeping the slots to the right as viewed when facing the panel end. The locking bar 14 is then passed through the spring 18 and through the slot in the top of the I beam 12. The spring 18 is then compressed enough to allow the hole 32 in the bottom of the locking bar 14 to be accessible from underneath the top of the I beam 12. The metal pull-ring 20 is then inserted into the hole in the bottom of the locking bar and tension on the spring is released.

To join two panels, the panel ends are aligned facing each other. They are then moved together until the tabs 26 from each begin to enter the slots 22 from the other. The panels are pressed together until they meet and a clicking sound is heard, evidencing engagement of the slots 38 of the locking bar 14 with the notches 40 of the tabs 26. As will be apparent to those skilled in the art, engagement of the beveled tabs 26 in the slots 38 deflects the locking bar 14 against the biasing of the spring 18 until the bar 14 snaps into locking engagement with the notch 40 securing the locking bar 14. The panels are now locked together.

To separate the two panels, one simply pulls down on both pull-rings 20 to disengage the locking bars 14 and tabs 26. The panels are then pulled apart until the tabs 26 exit the slots. The panels are now separated and the pull rings 20 may be released.

With continued reference to the drawings, a more detailed appreciation of the features and structure of the invention may be obtained. In FIG. 1, it can be seen that the tab 26 is of a shape that has been stamped out of the original extruded post form. Parallel to the tab 26 is shown the slot 38 in the sliding locking bar 14. Directly behind the locking bar slot 38, and, therefore, not visible in this drawing, is a matching slot in the vertical post 10 itself.

The locking bar 14 is contained by the open faced channel 16 in the vertical post 10, which allows the locking bar 14 to slide up or down. A cutout 24 in the bottom of the post 10 accepts a spring 18.

In assembly, the end of the locking bar 14 passes through the spring 18 until the upper part of the stamped out section 30 rests on the top of the spring 18. This is possible due to a reduction in the diameter of the locking bar caused by the stamped cutout.

The locking bar passes through a stamped out slot in the top of the I beam. By compressing the spring 18 slightly, it is possible to attach the split metal pull ring 20 to the stamped out hole 32 in the bottom of the sliding bar. When the tension on the spring is released, the spring pushes the sliding bar up until the split metal pull ring meets the underside of the I beam's top surface. The locking bar normally remains in this position with some spring tension active.

In FIG. 2, a cross sectional view of the extruded aluminum horizontal I beam 12 may be seen. The vertical post 10 mounts on top of this I beam 12 by means of four self tapping metal screws that tap into four circular channels 36 in the bottom of the post 10 as best shown in FIG. 3.

In FIG. 3, a cross sectional view of the extruded aluminum vertical post 10 can be seen. As set forth above, the four circular channels 36 used to receive the self tapping metal screws which attach the post 10 to the I beam 12 may be seen at corners of the extrusion. The arm or flange 28 from which the tab 26 is stamped is also shown, as is the open faced channel 16 which accepts the sliding locking bar 14.

In FIG. 4, there is presented a front view of the extruded aluminum vertical post 10. The lower section of the post 10 shows the rounded cutout shape 24 which is milled away to accept the compression spring 18. Through this spring will pass the end section of the sliding locking bar 24. The upper section shows the stamped out slot 22 that accepts the tab 26 from the adjoining panel.

Figure 5:
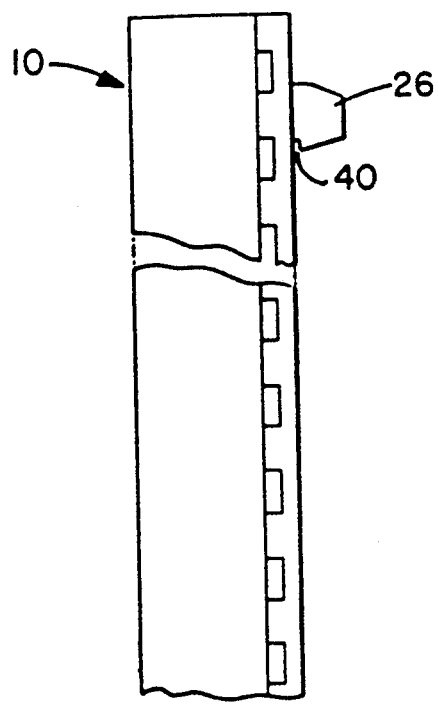
FIG. 5 is a side elevational view of the locking tab of the vertical post of FIG. 1.

FIG. 5 presents a side view of the tab 26, showing a notch 40 on its underside, into which the sliding locking bar 14 will fit and become secured as two adjoining panels are pressed together. The small rectangular stamped out sections of the flange 28 are part of the same stamping tool's work, but are unrelated to the quick-locking mechanism of the instant invention.

As seen in the front view of the sliding locking bar 14 as shown in FIG. 6, a small hole 32 is stamped in the very bottom to accept the split metal pull ring 20. A portion of the end segment of the bar is stamped away at 30, making the bar narrower. This allows the locking bar 14 to pass through the spring 18 until the wider part of the locking bar meets the top of the spring. The rectangular section 38 stamped out of the locking bar higher up, is the slot that accepts the corresponding tab 26 from an adjoining panel.

This it can be seen that the objects of the invention are satisfied by the structure presented hereinabove. While in accordance with the patent statutes, only the best mode and preferred embodiment of the invention has been presented and described in detail, it is to be understood that the invention is not limited thereto or thereby. Accordingly, for an appreciation of the true scope and breadth of the invention, reference should be had to the following claims.

What is claimed is:

1. In a panel for use in constructing a partition wall, the improvement, comprising:
   a vertical post at one end of the panel;
   a tab extending from said post;
   a slot within said post, said slot adapted to receive a tab from an adjoining panel;
   a locking bar in juxtaposition to said slot and adapted for making securing engagement with said tab from the adjoining panel, said locking bar being biased into said securing engagement;
   means connected to said locking bar for urging said locking bar from said securing engagement when manually actuated;
   a spring received by said vertical post and engaging said locking bar, said spring biasing said locking bar into said securing engagement, said locking bar being slidably received within a channel in said vertical post; and
   a pull ring secured to one end of said locking bar for allowing manual actuation of said locking bar against biasing of said spring.

2. The improvement according to claim 1, wherein said tabs are beveled for making deflecting engagement with said locking bar.

3. The improvement according to claim 2, wherein each said tab includes a notch at one end thereof for locking engagement with said locking bar.

4. The improvement according to claim 1, further comprising a base member secured to said vertical post at a bottom edge portion of said panel.

5. The improvement according to claim 1, wherein said tab and said slot of said vertical post are horizontally aligned with each other.

* * * * *